US008964789B1

(12) United States Patent
Lee et al.

(10) Patent No.: US 8,964,789 B1
(45) Date of Patent: Feb. 24, 2015

(54) METHOD AND SYSTEM FOR DATA SYNCHRONIZATION IN COMMUNICATION SYSTEMS USING REPETITIVE PREAMBLE PATTERNS

(75) Inventors: Jungwon Lee, Cupertino, CA (US); Jiwoong Choi, Sunnyvale, CA (US); Qing Zhao, Milpitas, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1436 days.

(21) Appl. No.: 12/609,862

(22) Filed: Oct. 30, 2009

Related U.S. Application Data

(60) Provisional application No. 61/113,427, filed on Nov. 11, 2008.

(51) Int. Cl.
*H04J 3/06* (2006.01)

(52) U.S. Cl.
USPC .......................................................... 370/503

(58) Field of Classification Search
USPC .......................................................... 370/503
See application file for complete search history.

(56) References Cited

U.S. PATENT DOCUMENTS

| 5,260,976 | A | 11/1993 | Dolivo et al. |
| 5,359,628 | A | 10/1994 | Muto |
| 7,092,452 | B2 | 8/2006 | Taylor et al. |
| 8,045,636 | B1 | 10/2011 | Lee et al. |
| 2003/0152023 | A1* | 8/2003 | Hosur et al. ............... 370/208 |
| 2003/0198303 | A1 | 10/2003 | Taylor et al. |
| 2005/0249319 | A1 | 11/2005 | Suh et al. |
| 2005/0265220 | A1 | 12/2005 | Erlich et al. |
| 2006/0133526 | A1 | 6/2006 | Zhang et al. |
| 2006/0182193 | A1 | 8/2006 | Monsen |
| 2006/0215538 | A1 | 9/2006 | Murthy et al. |
| 2006/0245349 | A1 | 11/2006 | Vrcelj et al. |
| 2007/0140366 | A1 | 6/2007 | Rore |

(Continued)

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

(Continued)

*Primary Examiner* — Jason Mattis
*Assistant Examiner* — Adnan Baig

(57) ABSTRACT

Methods and apparatus for data synchronization in communication systems using repetitive preamble patterns. In one embodiment, a method includes receiving a signal, where the received signal includes a data unit. The data unit includes a preamble symbol, and the preamble symbol has a start time and includes Q portions, each having the same pattern. The method further includes determining multiple possible values of a frame timing (FT). The method further includes determining multiple correlation functions including at least one correlation function corresponding to each of the multiple possible values of the FT, such that a given correlation function corresponding to a given possible value of the FT represents a correlation between data in two non-adjacent portions of the Q portions associated with the given FT. The method further includes selecting one of the multiple possible values of the FT based at least in part on the multiple determined correlation functions.

14 Claims, 4 Drawing Sheets

(56) References Cited

U.S. PATENT DOCUMENTS

| | | | |
|---|---|---|---|
| 2007/0147336 A1* | 6/2007 | Lee et al. | 370/350 |
| 2007/0217524 A1 | 9/2007 | Wang et al. | |
| 2010/0040043 A1* | 2/2010 | Li | 370/350 |

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., Apr. 2003.

S. A. Mujtaba, "IEEE P802.11—Wireless LANS, TGn Sync Proposal Technical Specification," The Institute of Electrical and Electronics Engineers, Inc., doc.: IEEE 802.11-04/0889r6, May 2005.

IEEE Std 802.16-2004 (Revision of IEEE Std 802.16-2001), "IEEE Standard for Local and metropolitan area networks, Part 16: Air Interface for Fixed Broadband Wireless Access Systems," *The Institute of Electrical and Electronics Engineers, Inc.*, Oct. 1, 2004; 893 pages.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

ETSI EN 300 744n, "Digital Video Broadcasting (DVB); Framing structure, channel coding and modulation for digital terrestrial television (DVB-T)," ETSI. Nov. 2004 pp. 1-64.

IEEE Std 802.16e-2005 "Standard for Local and metropolitan area networks, Part 16: Air interface for fixed and mobile broadband wirelss access systems," IEEE, Feb. 2006 (863 pages — 4 parts).

J. Massey, "Optimum frame synchronization," IEEE Trans. Commun., pp. 115-119, vol. 20, no. 2, Apr. 1972.

J. van de Beek et al., "ML estimation of time and frequency offset in OFDM systems," IEEE Trans. Signal Processing-. vol. 45, no. 7, pp. 1800-1805, Jul. 1997.

S. Muller-Weinfurtner, "On the optimality of metrics for coarse frame synchronization in OFDM: a comparison," Proc. IEEE PIMRC, pp. 533-537, Sep. 1998.

H. Minn et al., "A robust timing and frequency synchronization for OFDM systems," IEEE Trans. Wireless Commun., vol. 2, no. 4, pp. 822-839, Jul. 2003.

K. Shi et al., "Coarse frame and carrier synchronization of OFDM systems: a new metric and comparison," IEEE Trans. Wireless Commun., vol. 3, no. 4, pp. 1271-1284, Jul. 2004.

M. Morelli et al., "An improved frequency offset estimator for OFDMm applications," IEEE Commun. Letters, vol. 3, no. 1, pp. 75-77. -Mar. 1999.

J. Lee et al., "Optimal symbol timing estimation with various performance measures in OFDM systems," Proc. IEEE ICC, pp. 1969-1973, May 2005.

* cited by examiner

METHOD AND SYSTEM FOR DATA SYNCHRONIZATION IN COMMUNICATION SYSTEMS USING REPETITIVE PREAMBLE PATTERNS

CROSS REFERENCE TO RELATED APPLICATION

This application claims the benefit of U.S. Provisional Patent App. No. 61/113,427 entitled "Joint Estimation of Frame Timing and Carrier Frequency Offset for OFDM Systems Employing Time-Domain Repeated Preamble," filed Nov. 11, 2008, the disclosure of which is hereby expressly incorporated herein by reference.

FIELD OF TECHNOLOGY

The present disclosure relates generally to communication systems and, more particularly, to methods and systems for data synchronization in communication systems using repetitive preamble patterns.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Multiplexing (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective subcarrier, or carrier frequency. Data upon each subcarrier may be modulated with a modulation scheme such as quadrature amplitude modulation, phase shift keying, etc. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16 IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16 IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Further, the 802.16 standard, or WiMAX, applies to cell-based systems and supports MIMO techniques. Generally speaking, the use of MIMO technology produces significant increases in spectral efficiency and link reliability of IEEE 802.11, IEEE 802.16, and other systems, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

Various challenges may arise in wireless communication because of signal distortions or interruptions during transmission. One such challenge is synchronizing transmitted information. More specifically, when a frame (or another data unit) is transmitted from a transmitting device to a receiving device, the receiving device may need to establish and/or compensate for the frame timing (FT), e.g., the boundaries of the data unit, or, in other words, where the data unit starts and/or ends. Further, if the transmitting device is transmitting data via multiple carrier frequencies (e.g., using the OFDM scheme), the receiving device may need to establish and/or compensate for a carrier frequency offset (CFO), e.g., due to a difference between the carrier frequency of the transmitted signal and a frequency of the receiver's local oscillator.

Various synchronization techniques have been developed to address this challenge. Some of the most common techniques use a preamble symbol structure as the first symbol structure to mark a start of the frame, and, more generally, to provide a reference for frame synchronization. The preamble symbol structure establishes fixed relationships among subcarriers of the transmitted signal. The fixed relationships established through the use of the preamble symbol structure allow the devices, mobile stations, and the network to use or continue to transmit the information contained in the signal by minimizing the effects of distortions and interruptions. This can be achieved, for example, by using the preamble symbol structure to adjust a timing offset, a frequency offset, or transmitted signal power.

The preamble symbol can be arranged in a variety of ways to achieve a usable reference for frame synchronization. In some common synchronization techniques, often referred to as cross-correlation based synchronization techniques, a predefined preamble signal may be used that is different from other signals, and where the difference is detectable. The detectable difference may be created, for example, by power boosting the preamble symbols to a higher dB value than the other symbols, by using different modulation techniques for the preamble signal, by allocating the subcarriers of the preamble signal in a particular pattern, and so on. Thus, when a receiving device receives a signal, the received signal may then be cross-correlated with the predefined preamble signal to detect the presence, start, etc., of the predefined preamble signal.

One drawback of cross-correlation based synchronization techniques is that they require the receiving device to know the predetermined preamble signal, and possibly numerous predetermined preamble signals associated with different transmitting devices. This may lead to increased computational complexity, inefficient use of resources, higher costs, etc. Therefore, some synchronization techniques, often referred to as auto-correlation based synchronization techniques, employ preamble signals that are repetitive in the time domain. Exploiting the repetition property of the preamble signal, the receiver may determine the FT based on the auto-correlation of the received signal without the exact knowledge on the preamble signal. However, conventional auto-correlation based synchronization techniques are suboptimal.

SUMMARY

The present disclosure provides methods and apparatus for data synchronization in communication systems using repetitive preamble patterns.

In one embodiment, a method includes receiving a signal y, where the received signal y includes a data unit. The data unit includes a preamble symbol, and the preamble symbol has a start time and includes Q portions, where each of the Q portions has the same pattern. Each of the Q portions has a period of L, and Q is greater than or equal to 3. The method further includes determining multiple possible values of a frame timing (FT) corresponding to the start time of the preamble symbol. The method further includes determining multiple correlation functions including at least one correlation function corresponding to each of the multiple possible values of the FT, such that a given correlation function corresponding to a given possible value of the FT represents a correlation between data in two of the Q portions associated with the given FT, and such that these two of the Q portions are not adjacent in time. The method further includes selecting one of the multiple possible values of the FT based at least in part on the multiple determined correlation functions.

In various implementations, one or more of the following features may be included. The multiple determined correlation functions may include a set of correlation functions corresponding to each of the multiple possible values of the FT. A given set of correlation functions corresponding to a given possible value of the FT may represent correlations between data in all possible combinations of two portions selected from the Q portions.

The method may further include determining multiple possible values of a carrier frequency offset (CFO). Selecting one of the multiple possible values of the FT may include jointly selecting one of the multiple possible values of the FT and one of the multiple possible values of the CFO. Determining the multiple possible values of the CFO may include determining several possible values of the CFO for each of the multiple possible values of the FT. Additionally, or alternatively, determining the multiple possible values of the CFO may include determining a single value of the CFO for each of the multiple possible values of the FT.

In another embodiment, a method includes receiving a signal y, where the received signal y includes a data unit. The data unit includes a preamble symbol, and the preamble symbol has a start time and includes Q portions, where each of the Q portions has the same pattern. Each of the Q portions has a period of L, and Q is greater than or equal to 3. The method further includes selecting two of the Q portions of the preamble symbol, where the two selected portions are not adjacent in time. The method further includes determining a frame timing (FT) corresponding to the start time of the preamble symbol based at least in part on the two selected portions of the preamble symbol.

In various implementations, one or more of the following features may be included. For example, determining the FT corresponding to the start time of the preamble symbol based at least in part on the two selected portions of the preamble symbol may include determining the FT corresponding to the start time of the preamble symbol based on all of the Q portions of the preamble symbol.

The method may further include determining a carrier frequency offset (CFO) based on the two selected portions of the preamble symbol. Determining the FT and determining the CFO may include determining multiple possible values of the FT, determining multiple possible values of the CFO, and jointly determining one of the multiple possible values of the FT and one of the multiple possible values of the CFO.

Determining the multiple possible values of the CFO may include determining multiple possible values for each of the multiple possible values of the FT. Additionally, or alternatively, determining the multiple possible values of the CFO may include determining a single value of the CFO for each of the multiple possible values of the FT.

In another embodiment, an apparatus includes a receiver configured to receive a signal y, where the received signal y includes a data unit. The data unit includes a preamble symbol, and the preamble symbol has a start time and includes Q portions in time, where each of the Q portions has the same pattern. Each of the Q portions has a period of L, and Q is greater than or equal to 3. The receiver includes a synchronizer. The synchronizer is configured to determine multiple possible values of a frame timing (FT) corresponding to the start time of the preamble symbol. The synchronizer is further configured to determine multiple correlation functions including at least one correlation function corresponding to each of the multiple possible values of the FT. A given correlation function corresponding to a given possible value of the FT represents a correlation between data in two of the Q portions associated with the given FT, and wherein these two of the Q portions are not adjacent in time. The synchronizer is further configured to select one of the multiple possible values of the FT based at least in part on the multiple determined correlation functions.

In various implementations, one or more of the following features may be included. The multiple determined correlation functions may include a set of correlation functions corresponding to each of the multiple possible values of the FT. A given set of correlation functions corresponding to a given possible value of the FT may represent correlations between data in all possible combinations of two portions selected from the Q portions.

The synchronizer may be further configured to determine multiple possible values of a carrier frequency offset (CFO). The synchronizer may be further configured to jointly select one of the multiple possible values of the FT and one of the multiple possible values of the CFO.

The synchronizer may be configured to determine the multiple possible values of the CFO by determining several possible values of the CFO for each of the multiple possible values of the FT. Additionally, or alternatively, the synchronizer may be configured to determine the multiple possible values of the CFO by calculating a single value of the CFO for each of the multiple possible values of the FT.

DETAILED DESCRIPTION

Figure 1:
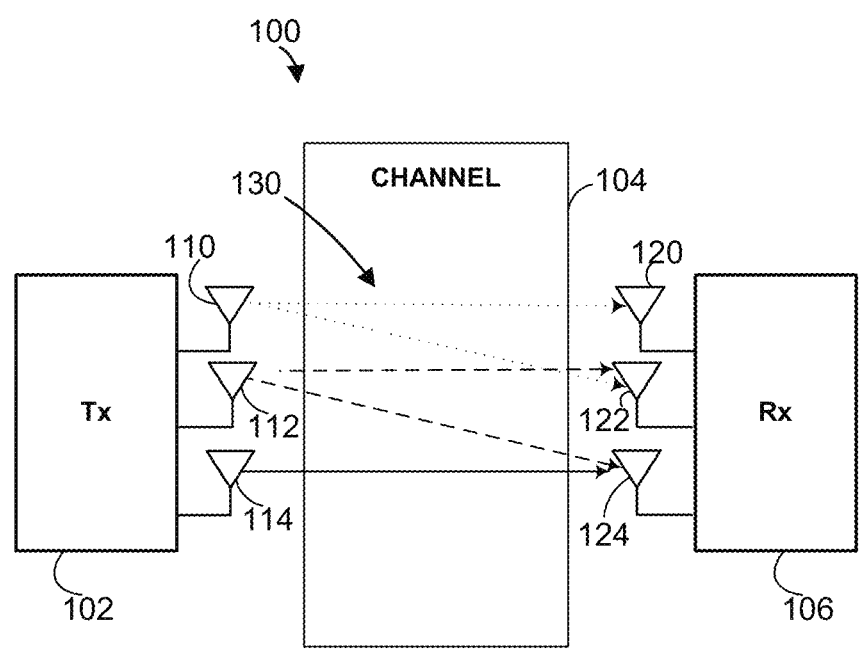
FIG. 1 is a block diagram of an example wireless communication system.

FIG. 1 is a block diagram of an example communication system 100 in which a transmitting device 102 transmits information over a wireless communication channel 104 to a receiving device 106. Each of the devices 102 and 106 may be a base station or a mobile station equipped with one or more antennas 110-114 and 120-124, respectively. Further, the communication channel 104 includes multiple subcarriers, each associated with a particular carrier frequency at which the devices 102 and 106 may communicate. The antennas 110-114 and 120-124 may define multiple spatial streams 130 within the wireless communication channel 104 during operation of the devices 102 and 106. In general, the communication system 100 may include any number of devices, each equipped with the same or a different number of antennas such as 1, 2, 3, 4, etc. The communication system 100 may also include any number of subcarriers. In the embodiment illustrated in FIG. 1, the wireless communication system 100 uses an OFDM technique, and the subcarriers are accordingly selected to be mutually orthogonal (i.e., to minimize crosstalk between each pair of subcarriers). However, the communication system 100 could also use any other frequency division multiplexing technique.

It will be noted that while the example communication system 100 is a MIMO system, at least some of the synchronization techniques discussed herein may be applied to a system with a single-antenna receiver and/or a single-antenna transmitter. Still further, it will be understood that while the example communication system 100 is a wireless communication system, at least some of the synchronization techniques discussed herein may be applied to wired systems, such as wired OFDM systems, e.g., baseband digital subscriber lines (DSL).

Figure 2:
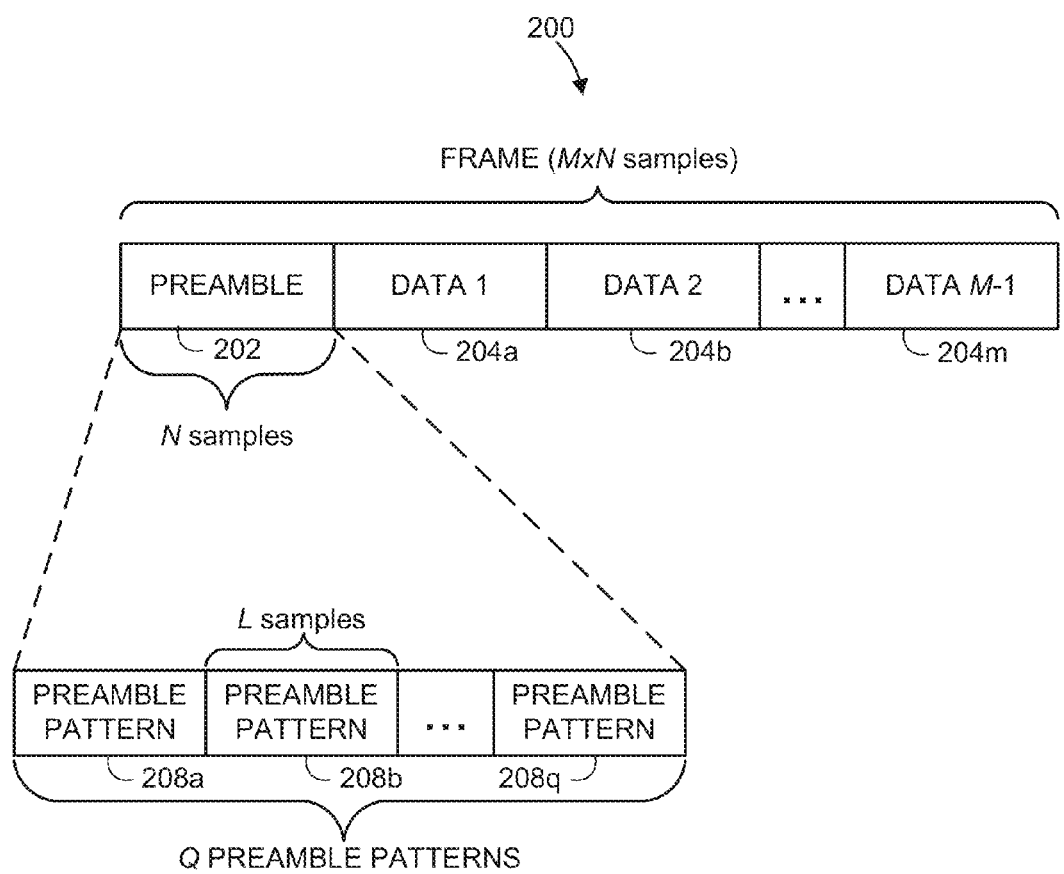
FIG. 2 is a block diagram of an example data frame.

FIG. 2 is a block diagram of an example data frame 200 that may be used in the wireless communication system 100 to transmit signals over wireless communication channel 104. It will be understood, however, that the communication system 100 may alternatively use other types of data frames 200. It will also be understood that the data frame 200 can be utilized in other communication systems, such as wired communication systems.

The data frame 200 may include M symbols, including a preamble symbol 202 and one or more (e.g., M−1) data symbols 204. The preamble symbol 202 may include a predetermined N-bit preamble binary sequence $X_p[k]$ in the frequency domain, where k is subcarrier index (=0, 1, 2, . . . N−1). Furthermore, in order to be detectable via autocorrelation, the preamble binary sequence $X_p[k]$ may include a preamble pattern of length, or period L that is repeated Q (e.g., 3 or more) times in time. For ease of explanation, but without loss of generality, it is assumed that L is an integer. For example, the preamble binary sequence $X_p[k]$ may be given by $$X_p[k] = \begin{cases} \pm 1, & \mod(k, Q) = q_s \\ 0, & \text{otherwise} \end{cases} \quad (1)$$

where mod( ) is a modular function and $q_s$ is a frequency offset, $q_s \in \{0, 1, \ldots, Q-1\}$, which may be used, for example, as an index for cell (or sector) identification in cellular systems. For ease of explanation, but without loss of generality, it is assumed that $q_s=0$. Then, the preamble signal $x_p[n]$ may be represented in the time domain as $$x_p[n+hL]=x_p[n], n=0, \ldots, L-1 \text{ and } h=0, \ldots, Q-1 \quad (2)$$

where $L=N/Q$. The transmitted signal $x[n]$ at time n, with the average signal power $$\sigma_x^2 = E\{|x[n]|^2\},$$

can be represented as $$x[n] = \begin{cases} x_p[n], & n \in \text{preamble symbol} \\ x_d[n], & \text{otherwise} \end{cases} \quad (3)$$

where $x_d[n]$ is the data signal in time domain. Considering a delayed channel with an integer sample delay $\tau$ between the transmitting device and the receiving device, the received time-domain signal may be represented in a discrete form as $$y[n]=x[n-\tau]e^{j2\pi\epsilon n/N}+z[n] \quad (4)$$

where $\in$ is a carrier frequency offset (CFO) normalized, for example, by a subcarrier spacing $f_s$, and $z[n]$ is background noise plus interference at time n that can be approximated, for example, as zero-mean additive white Gaussian noise (AWGN) with variance $\sigma_z^2$. As will be subsequently described in more detail, given the observation of received samples $\bar{y}=\{[n]|n=0, 1, \ldots, MN-1\}$, the FT $\tau$ and the CFO $\in$ can be estimated using joint maximum-likelihood (ML) synchronization and/or joint near-ML synchronization.

Conventional Techniques

Before discussing the details of joint ML and joint near-ML synchronization techniques, conventional auto-correlation based synchronization techniques used in OFDM will be described to provide background. As mentioned above, generally speaking, conventional auto-correlation techniques perform synchronization based on time-domain repeated patterns in the preamble that are adjacent to each other. More specifically, using conventional techniques, the FT $\tau_c$ and the CFO $\in_c$ may be jointly estimated as follows:

$$(\tau_c, \varepsilon_c) = \underset{(\tau,\varepsilon)}{\operatorname{argmax}} \left\{ \operatorname{Re}\{\alpha^{-1} Y_c(\tau)\} - \rho \frac{Q-1}{Q} \Phi(\tau) \right\} \quad (5)$$

where $\alpha=e^{-j2\pi\in/Q}$, $\rho=\sigma_x^2/(\sigma_x^2+\sigma_z^2)=(1+\gamma^{-1})^{-1}$, and $\gamma$ is a signal-to-noise power ratio (SNR), $\gamma=\sigma_x^2/\sigma_z^2$, and $$Y_c(\tau) = \sum_{i=0}^{Q-2} \left( \sum_{n=r}^{\tau+L-1} y[n+iL]y*[n+(i+1)L] \right) \quad (6)$$

$$\Phi(\tau) = \sum_{i=0}^{Q-1} \left( \sum_{n=r}^{\tau+L-1} |y[n+iL]|^2 \right)$$

where $Y_c(\tau)$ is a correlation term and $\Phi(\tau)$ is a compensation factor related to the received signal power. Substituting equations (6) into equation (5), the FT $\tau_c$ and the CFO $\in_c$ may be jointly estimated using conventional techniques as follows:

$$(\tau_c, \varepsilon_c) = \underset{(\tau,\varepsilon)}{\operatorname{argmax}} \left\{ |Y_c(\tau)| \cos\left(\frac{2\pi\varepsilon}{Q} + \angle Y_c(\tau)\right) - \rho \frac{Q-1}{Q} \Phi(\tau) \right\} \quad (7)$$

where $\angle$ denotes the angle, or phase of a complex number. Thus, equation (7) is maximized when the cosine term in the equation is equal to 1. As a result the FT $\tau_c$ and the CFO $\in_c$ may be obtained using conventional techniques as $$\tau_c = \underset{\tau}{\operatorname{argmax}} \left\{ |Y_c(\tau)| - \rho \frac{Q-1}{Q} \Phi(\tau) \right\} \quad (8)$$

$$\varepsilon_c = -\frac{Q}{2\pi} \angle Y_c(\tau_c) + nQ$$

where n is an integer.

The accuracy of $\in_c$ and $\tau_c$, estimated using conventional techniques, may be enhanced by exploiting the sum of partial correlation between non-adjacent patterns. For example, FT $\tau_p$ and the CFO $\in_p$ may be obtained using these enhanced techniques as $$\tau_p = \underset{\tau}{\operatorname{argmax}} \{|Y_p(\tau)| - \rho(Q-1)\Phi(\tau)\} \quad (9)$$

$$\varepsilon_p = -\frac{Q}{2\pi} \angle Y_p(\tau_p) + nQ$$

where n is an integer, and where $$Y_p(\tau) = 2 \sum_{k=1}^{Q-1} \left| \sum_{i=0}^{(Q-1)-k} \left( \sum_{n=r}^{\tau+L-1} y[n+iL]y*[n+(i+k)L] \right) \right| \quad (10)$$

It should be noted that the FT $\tau_c$ estimation in equation (10) includes Q/2 time more correlation terms than the FT $\tau_c$ estimation in equation (6) as a result of the additional correlation terms associated with non-adjacent patterns (where $k \neq 1$). It should also be noted that the CFO estimation remains unchanged. Since the patterns having the same time lag difference k that experience the same phase rotation $\alpha^{-k}$ are grouped for partial correlation before magnitude calculation and summation, the FT may be calculated independently of the CFO.

Similarly to the above modification of FT estimation, CFO estimation can also be improved for a given FT estimate $\bar{\tau}$ by considering additional correlation terms between non-adjacent patterns. For example, the improved CFO $\in_{c,i}$ may be written as $$\varepsilon_{c,i} = -\frac{Q}{2\pi}\left(\sum_{m=1}^{Q-1} \bar{\omega}(m)\varphi(m)\right) + nQ, \quad (11)$$

where n is an integer, and where $$\bar{\omega}(m) = \frac{3(Q-m)(Q-m+1) - (Q-1)}{(Q-1)(Q^2-2Q+3)}, \quad 1 \leq m \leq Q-1 \quad (12)$$

$$\varphi(m) = [\angle\{R(m-1)\} - \angle\{R(m)\}]_{2\pi}, \quad 1 \leq m \leq Q-1$$

$$R(k) = \frac{1}{Q-k}\sum_{i=0}^{(Q-1)-k}\left(\sum_{n=\bar{\tau}}^{\bar{\tau}+L-1} y[n+iL]y*[n+(i+k)L]\right), \quad 0 \leq k \leq Q-1$$

and where $[\ ]_{2\pi}$ denotes modulo-$2\pi$ operation, reducing the interval of the angle to $[-\pi, \pi]$.

Joint Synchronization

Examples of new synchronization techniques will now be described.

Figure 3:
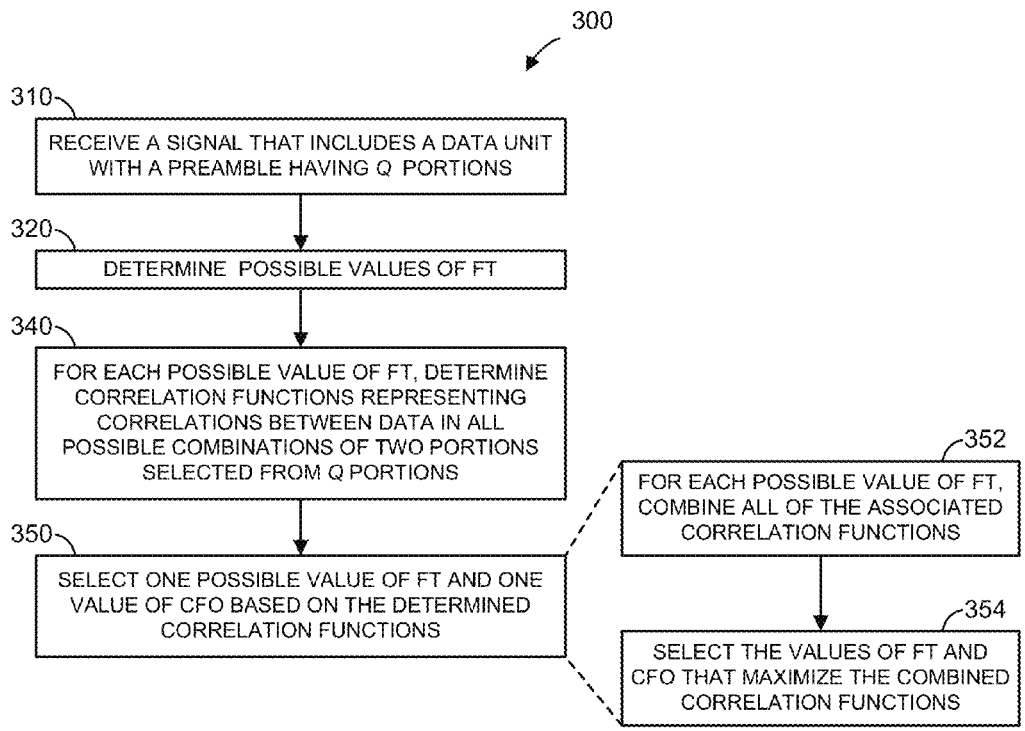
FIG. 3 is a flow diagram illustrating an example method for jointly estimating the frame timing and the carrier frequency offset using ML and near-ML synchronization techniques.

FIG. 3 is a flow diagram illustrating an example method 300 for jointly estimating the FT and the CFO using ML and near-ML synchronization techniques. The ML and near-ML synchronization techniques described below may be used to jointly estimate the FT and the CFO of a received signal when the received signal includes a data unit with a preamble symbol, and the preamble symbol includes Q time portions (e.g., Q greater than 2), where each of the Q time portions has the same pattern of L bits. When such a signal is received (block 310), multiple possible values of FT may be determined, e.g., corresponding to the time samples of the received signal (block 320). For each possible value of FT, correlation functions representing correlations between data in all possible combinations of two portions selected from Q time portions may be determined (block 340). In other words, for each possible pair of portions selected from Q portions, the data associated with the two portions of the pair, relative to a given FT, may be correlated. Based on the determined correlation functions, one value of FT and one value of CFO may be selected (block 350). For example, in some embodiments, as will be subsequently explained in more detail, all of the correlation functions associated with each individual value of FT may be combined, e.g., added, (block 352), and the values of FT and CFO that maximize the combination of the respective correlation functions may be selected (block 354). It should be noted that unlike conventional techniques described above, the method 300 for jointly estimating the FT and the CFO illustrated in FIG. 3 is based at least in part on the correlation of time-domain repeated patterns in the preamble that are not adjacent to each other.

Joint ML Synchronization

More specifically, in some embodiments, the FT $\tau$ and the CFO $\in$ may be determined such that the conditional probability density function (pdf) f $f(\bar{y}|\tau,\tau)$ for a given $\tau, \in$ pair is maximized for MN observed samples of y[n]. In some embodiments, the maximization of $f(\bar{y}|\tau,\in)$ can be performed using a log-likelihood function of $f(\bar{y}|\tau,\in)$, such as $$\Lambda(\tau, \varepsilon) = \log(f(\bar{y} \mid \tau, \varepsilon)) \quad (13)$$

$$= \log\left\{\prod_{n\in I_0}(f(y[n], y[n+L], \ldots, y[n+(Q-1)L] \mid \tau, \varepsilon))\prod_{n\notin I_0 \cup I_1 \ldots \cup I_{Q-1}} f(y[n] \mid \tau, \varepsilon)\right\}$$

$$= \log\left\{\prod_{n\in I_0}\left(\frac{(f(\bar{p}(n)) \mid \tau, \varepsilon)}{f(y[n] \mid \tau, \varepsilon)f(y[n+L] \mid \tau, \varepsilon) \ldots f(y[n+(Q-1)L] \mid \tau, \varepsilon)}\right)\prod_{n=0}^{MN-1}(f(y[n] \mid \tau, \varepsilon))\right\}$$

where $\bar{p}(n)=[y[n]y[n+L] \ldots y[n+(Q-1)L]]^T$, $n\notin I_0$ where $I_i$ is the index set of the i-th periodic portion of the preamble signal, $i=0, 1, \ldots, (Q-1)$. Here $\bar{p}(n)$ may follow a Q-dimensional Gaussian distribution, such as $$f(\bar{p}(n) \mid \tau, \varepsilon) = \frac{\det(-\bar{p}(n)^H K^{-1} \bar{p}(n))}{\pi^Q \det(K)} \quad (14)$$

where H is a conjugate transpose, and K is a Q×Q correlation matrix, such as $$K = \begin{bmatrix} \sigma_x^2 + \sigma_z^2 & \sigma_x^2\alpha & \cdots & \sigma_x^2\alpha^{Q-1} \\ \sigma_x^2\alpha^* & \sigma_x^2 + \sigma_z^2 & & \sigma_x^2\alpha^{Q-2} \\ \vdots & & \ddots & \vdots \\ \sigma_x^2(\alpha^*)^{Q-1} & \sigma_x^2(\alpha^*)^{Q-2} & \cdots & \sigma_x^2 + \sigma_z^2 \end{bmatrix} \quad (15)$$

where the (i, j)-th element of K is equal to $E\{y[n+iL]y^*[n+jL]\}$, $n\notin I_0$, i, $j\notin\{0, 1, 2, \ldots, Q-1\}$. Then the inverse and the determinant of K may be obtained as $$K^{-1} = \frac{1}{\sigma_x^2(Q\sigma_x^2 + \sigma_z^2)} = \quad (16)$$

$$\begin{bmatrix} (Q-1)\sigma_x^2 + \sigma_z^2 & -\sigma_x^2\alpha & \cdots & -\sigma_x^2\alpha^{Q-1} \\ -\sigma_x^2\alpha^* & (Q-1)\sigma_x^2 + \sigma_z^2 & & -\sigma_x^2\alpha^{Q-2} \\ \vdots & & \ddots & \vdots \\ -\sigma_x^2(\alpha^*)^{Q-1} & -\sigma_x^2(\alpha^*)^{Q-2} & \cdots & (Q-1)\sigma_x^2 + \sigma_z^2 \end{bmatrix}$$

$$\det(K) = (\sigma_z^2)^{Q-1}(Q\sigma_x^2 + \sigma_z^2)$$

After some algebraic calculations, the ML estimates of $\tau$ and $\in$ may be represented as $$(\tau_0, \varepsilon_0) = \arg\max_{(\tau,\varepsilon)}\Lambda(\tau, \varepsilon) = \arg\max_{(\tau,\varepsilon)}\{Y_0(\tau, \varepsilon) - \rho(Q-1)\Phi(\tau)\} \quad (17)$$

where $$Y_0(\tau, \varepsilon) = 2 \sum_{k=1}^{Q-1} \text{Re}\left\{ a^{-k} \sum_{i=0}^{(Q-1)-k} \left( \sum_{n=\tau}^{\tau+L-1} y[n+iL] y^*[n+(i+k)L] \right) \right\} \quad (18)$$

$$= 2 \sum_{k=1}^{Q-1} \text{Re}\{a^{-k} \Psi_k(\tau)\}$$

$$\Psi_k(\tau) = \sum_{i=0}^{(Q-1)-k} \left( \sum_{n=\tau}^{\tau+L-1} y[n+iL] y^*[n+(i+k)L] \right).$$

By substituting $\Psi_k(\tau)$ and multiple discrete candidates of $\alpha$ into equation (18) and then substituting $\Phi(\tau)$ and $Y_0(\tau, \in)$ into equation (17), $\Lambda(\tau, \in)$ may be determined for each $\tau$ and $\in$. The $\tau$ and $\in$ maximizing $\Lambda(\tau, \in)$ may be selected as the FT and the CFO respectively. In other words, for each $\tau$ out of MN candidates, $\Psi_k(\tau)$ may be calculated for each k, k=1, ... (Q−1). $\Phi(\tau)$ may then be determined for each $\tau$.

When Q=2 (i.e., the pattern is repeated twice in the preamble), the correlation set includes of a set $\{I_0, I_1\}$, and equation (17) may be reduced to equation (5).

It should be noted that equation (10) may be regarded as an approximation of equation (18) in the absence of the CFO estimate. Thus, the joint ML synchronization technique may improve the performance of synchronization, because the joint ML synchronization technique uses full correlation and compensates for the CFO effect with multiplications of $\alpha^{-k}$, whereas partial correlation is added in equation (10) between patterns with the same CFO effect (e.g., the same $\alpha^{-k}$).

In some embodiments, the CFO error may be negligible. For example, wired OFDM systems including baseband digital subscriber lines (DSL) have negligible CFO. Likewise, wireless systems may accurately compensate the CFO prior to frame synchronization using other frequency offset estimation methods, including those currently known in the art. In such cases, the joint ML estimation of equation (17) may be reduced to ML FT estimation. That is, the ML FT may be obtained by substituting a known term a into equation (18). In this case, the advantage of the joint ML estimation method described herein still holds over the conventional methods.

Joint Near-ML Synchronization in the absence of integer CFO

In the joint ML synchronization techniques described above, the correlation between $\{I_i, I_j\}$ in equation (18) is associated with a phase compensation of $\alpha^{-k}$, k={−(Q−1), ..., −1, 0, 1, ..., (Q−1)}, that is performed prior to summation in order to ensure coherent summation. Thus, different k's and the associated $\alpha^{-k}$ may prevent separate estimation of the FT and the CFO. As a result, when the CFO is unknown, the optimum joint ML synchronization scheme may require a relatively large number of computations, which may lead to increased complexity. In order to mitigate this complexity, a joint near-ML synchronization technique may be used.

It should be noted that the first and second partial derivatives of $\Lambda(\tau, \in)$ on the CFO, as discussed above, can be represented as $$\frac{\partial \Lambda(\tau, \varepsilon)}{\partial \varepsilon} = \frac{\partial Y_0(\tau, \varepsilon)}{\partial \varepsilon} \quad (19)$$

$$= \frac{\partial}{\partial \varepsilon} \left\{ 2 \sum_{k=1}^{Q-1} \text{Re}\{a^{-k} \Psi_k(\tau)\} \right\}$$

-continued $$= \frac{\partial}{\partial \varepsilon} \left\{ 2 \sum_{k=1}^{Q-1} |\Psi_k(\tau)| \cos\left( \angle \Psi_k(\tau) + \frac{2\pi\varepsilon}{Q} k \right) \right\}$$

$$= -\sum_{k=1}^{Q-1} \frac{4\pi k}{Q} |\Psi_k(\tau)| \sin\left( \angle \Psi_k(\tau) + \frac{2\pi\varepsilon}{Q} k \right)$$

$$\frac{\partial^2 \Lambda(\tau, \varepsilon)}{\partial \varepsilon^2} = 2 \sum_{k=1}^{Q-1} \left( \frac{2\pi k}{Q} \right)^2 |\Psi_k(\tau)| \cos\left( \angle \Psi_k(\tau) + \frac{2\pi\varepsilon}{Q} k \right)$$

Since the correct CFO $\in$ satisfies $\angle \Psi_k(\tau) = -2\pi \in k/Q$ for correct FT $\tau$ in the absence of noise, it may be assumed that $\angle \Psi_k(\tau) \approx -2\pi \in k/Q$ unless the SNR is quite low, for example, resulting in $\cos(\angle \Psi_k(\tau) + 2\pi \in k/Q) \approx 1$. This approximation may be accurate for the SNR range of interest (e.g., larger than 0 dB). Accordingly, in a CFO range of interest, e.g., around $\in = -Q \angle \Psi_k(\tau)/2\pi k$, $\partial \Lambda(\tau, \in)/\partial \in$ is monotonically decreasing due to $\partial^2 \Lambda(\tau, \in)/\partial \in^2$ being less than zero. Thus, $\Lambda(\tau, \in)$ may be maximized for $\in$ satisfying $\partial \Lambda(\tau, \in)/\partial \in = 0$. Using the approximation of $\sin x \approx x$, when x is much less than 1, $\partial \Lambda(\tau, \in)/\partial \in = 0$ may be represented as $$\frac{\partial \Lambda(\tau, \varepsilon)}{\partial \varepsilon} \approx -\sum_{k=1}^{Q-1} \frac{4\pi k}{Q} \left( |\Psi_k(\tau)| \angle \Psi_k(\tau) + |\Psi_k(\tau)| \frac{2\pi\varepsilon}{Q} k \right) = 0. \quad (20)$$

As a result, the near-ML, or sub-optimum CFO estimate $\in_{so}(\tau)$ corresponding to a given FT $\tau$ can be approximately represented as $$\varepsilon_{so}(\tau) = -\frac{Q}{2\pi} \frac{\sum_{k=1}^{Q-1} k |\Psi_k(\tau)| \angle \Psi_k(\tau)}{\sum_{k=1}^{Q-1} k^2 |\Psi_k(\tau)|} \quad (21)$$

Substituting $e_{so}(\tau)$ into equation (18) for each $\tau$, the near-ML, or sub-optimum FT estimate $\tau_{so}$ may be obtained as $$\tau_{so} = \arg \max_{\tau} \Lambda(\tau, \varepsilon_{so}(\tau)) = \arg \max_{\tau} \{Y_0(\tau, \varepsilon_{so}(\tau)) - \rho(Q-1)\Phi(\tau)\} \quad (22)$$

Since the CFO $\in_{so}$ may be uniquely determined given an FT estimate $\tau_{so}$, computational complexity of the near-ML synchronization technique may be significantly lower as compared to that of the ML synchronization technique, where both FT and CFO may be searched exhaustively.

Joint Near-ML Synchronization in the Presence of Integer CFO

It should be noted that the CFO estimation range of the ML synchronization technique and near-ML synchronization technique described above is half of the subcarrier spacing $f_s/2$, which is smaller than $(Qf_s)/2$ of the conventional synchronization techniques described above. This is a result of the integer CFO uncertainty caused by the full correlation between non-adjacent repetition patterns in equation (18). Moreover, when the CFO is larger than $f_s/2$, a correct fractional CFO and/or the correct integer CFO might not be obtained due to ambiguity as a result of the rotation of $2\pi$. In order to avoid this problem, in some embodiments, the fractional CFO $\epsilon_{so2}$ may be estimated as $$\epsilon_{so2} = \frac{\sum_{k=1}^{Q-1} \varpi_2(k) \angle (\Psi_k(\tau)^{Q/k})}{2\pi} \qquad (23)$$

where the term $\Psi_k(\tau)^{Q/k}$ allows the same phase difference irrespective of k and $\overline{\omega}_2$(k) is the weight of k-th correlation term $$\left( \sum_{k=1}^{Q-1} \varpi_2(k) = 1 \right).$$

For example, $\overline{\omega}_2$(k) may be equal to $(Q-1)^{-1}$ for equal weighting.

The CFO may also be calculated by taking angle values after summation of terms of different k to avoid ambiguity due to a rotation of $2\pi$ (e.g., as a result of noise). Consequently, in some embodiments, the fractional CFO $\epsilon_{so2}$ may be estimated as $$\epsilon_{so2} = \frac{\angle \left( \sum_{k=1}^{Q-1} \varpi_3(k) \angle (\Psi_k(\tau)^{Q/k}) \right)}{2\pi} \qquad (24)$$

Once the fractional CFO is estimated, e.g., using equation (23) or equation (24), the integer CFO may be alternatively estimated without substantial complexity using the frequency-domain correlation of the preamble symbol (that is usually modulated by random sequence for ease of integer CFO correction). Accordingly, the range of the CFO estimation may be increased.

Figure 4:
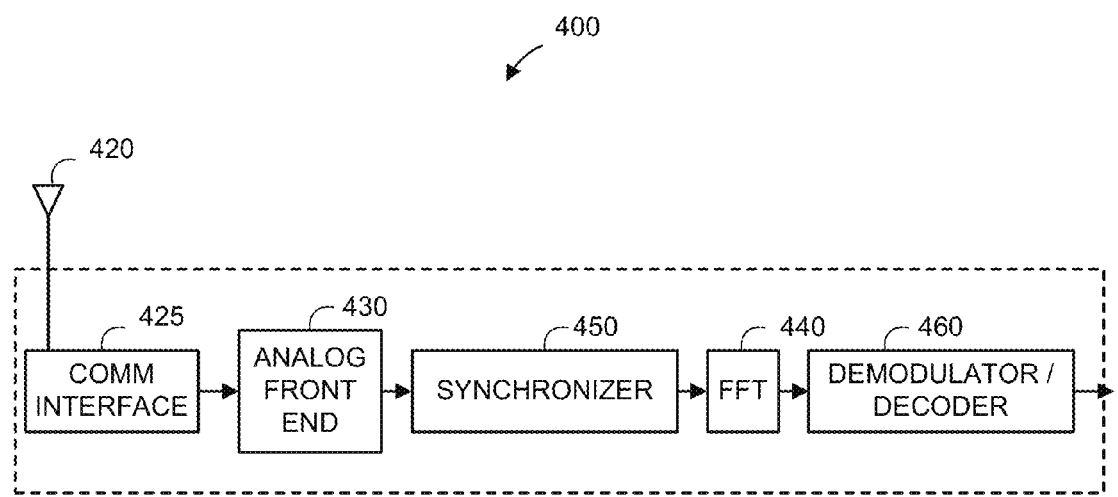
FIG. 4 is a block diagram of an example receiving device capable of performing joint synchronization.

FIG. 4 is a block diagram of an example receiving device 400 capable of performing joint synchronization. The receiving device 400 may be utilized in the wireless communication system 100 as the receiving device 106, for example. Furthermore, the receiving device 106 may implement some or all of the synchronization techniques described above. It will be understood, however, that the wireless communication system 100 may alternatively use another receiving device 106, and that other receiving devices may also implement the synchronization techniques described herein.

The receiving device 400 generally may include one or more receive antennas 420 for receiving radio signals and one or more communication interfaces 425. Alternatively, or in addition, the receiving device 400 may include one or more wired connects for receiving signals. The receiving device 400 may further include RF receiving units (e.g., analog front end 430), including an analog-to-digital converter to sample received analog signals and convert them to digital form. In order to perform certain processing functions, the receiving device 400 may convert the received signal from time domain to frequency domain, using, for example, a Fast Fourier Transform (FFT) unit 440. The received signals may be converted to frequency domain at various stages of processing.

The receiving device 400 may further include a synchronizer 450 that may perform some or all of the joint synchronization techniques described above. Although FIG. 4 illustrates synchronization in time domain (before the received signals are converted to the frequency domain by the FFT units 440), synchronization may also take place in frequency domain (after the received signals are converted to the frequency domain by the FFT units 440). The receiving device 400 may further include demodulator/decoder units 460 (e.g., including QAM demodulators, BPSK demodulators, etc.) that generally demodulate and decode the received signals into information symbols.

It should be understood that the receiving device 400, in some embodiments, or in some modes of operation, may not include one or more of the modules 420-460 described above or, alternatively, may not use each of the modules 420-460 for the purpose of synchronization. Furthermore, it will be appreciated that, if desired, some of the modules 420-460 may be combined, or divided into distinct units. Still further, the receiving device 400 may include additional modules that are not shown for ease of explanation.

At least some of the various blocks in FIGS. 1 and 3-4, operations, and techniques described above may be implemented in hardware, a processor executing firmware instructions, a processor executing software instructions, or any combination thereof. When implemented in a processor executing firmware or software instructions, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:
1. A method comprising:
receiving a signal y, the received signal y including a frame, the frame including a preamble symbol, the preamble symbol having a start time and including Q portions, each of the Q portions having the same pattern, wherein Q is greater than or equal to 3, and wherein each of the Q portions has a period of L;

determining a plurality of possible values of a frame timing (FT) corresponding to the start time of the preamble symbol;

determining a plurality of correlation functions including at least one correlation function corresponding to each of the plurality of possible values of the FT, wherein a given correlation function corresponding to a given possible value of the FT represents a correlation between data in two of the Q portions associated with the given FT, and wherein the two of the Q portions are not adjacent in time; and selecting one of the plurality of possible values of the FT based at least in part on the determined plurality of correlation functions.

2. The method of claim 1, wherein the determined plurality of correlation functions includes a set of multiple correlation functions, the set of multiple correlation functions corresponding to each of the plurality of possible values of the FT, wherein a given set of multiple correlation functions corresponding to a given possible value of the FT represents correlations between data in all possible combinations of two portions selected from the Q portions.

3. The method of claim 2, further comprising determining a plurality of possible values of a carrier frequency offset (CFO).

4. The method of claim 3, wherein selecting one of the plurality of possible values of the FT comprises jointly selecting one of the plurality of possible values of the FT and one of the plurality of possible values of the CFO based at least in part on the determined plurality of correlation functions.

5. The method of claim 3, wherein determining the plurality of possible values of the CFO comprises determining a plurality of possible values of the CFO for each of the plurality of possible values of the FT.

6. The method of claim 3, wherein determining the plurality of possible values of the CFO comprises calculating a single value of the CFO for each of the plurality of possible values of the FT.

7. The method of claim 6, wherein calculating the single value of the CFO for a given value $\tau$ of the FT comprises calculating $$-\frac{Q}{2\pi} \frac{\sum_{k=1}^{Q-1} k|\Psi_k(\tau)| \angle \Psi_k(\tau)}{\sum_{k=1}^{Q-1} k^2|\Psi_k(\tau)|},$$

wherein $$\Psi_k(\tau) = \sum_{i=0}^{(Q-1)-k} \left( \sum_{n=\tau}^{\tau+L-1} y[n+iL]y^*[n+(i+k)L] \right),$$

and wherein i is an index corresponding to a particular one of the Q portions of the preamble symbol, n is an index corresponding to a particular value in the preamble symbol in time domain, and k is an index corresponding to a gap between a particular pair of Q portions.

8. The method of claim 6, wherein calculating the single value of the CFO for a given value $\tau$ of the FT comprises calculating $$\frac{\sum_{k=1}^{Q-1} \varpi_2(k) \angle (\Psi_k(\tau)^{Q/k})}{2\pi},$$

wherein $$\Psi_k(\tau) = \sum_{i=0}^{(Q-1)-k} \left( \sum_{n=\tau}^{\tau+L-1} y[n+iL]y^*[n+(i+k)L] \right),$$

and wherein $\overline{\omega}_2(k)$ is a weight value, i is an index corresponding to a particular one of the Q portions of the preamble symbol, n is an index corresponding to a particular value in the preamble symbol in time domain, and k is an index corresponding to a gap between a particular pair of Q portions.

9. The method of claim 6, wherein calculating the single value of the CFO for a given value $\tau$ of the FT comprises calculating $$\frac{\angle \left( \sum_{k=1}^{Q-1} \varpi_3(k) \angle (\Psi_k(\tau)^{Q/k}) \right)}{2\pi},$$

wherein $$\Psi_k(\tau) = \sum_{i=0}^{(Q-1)-k} \left( \sum_{n=\tau}^{\tau+L-1} y[n+iL]y^*[n+(i+k)L] \right),$$

and wherein $\overline{\omega}_3(k)$ is a weight value, i is an index corresponding to a particular one of the Q portions of the preamble symbol, n is an index corresponding to a particular value in the preamble symbol in time domain, and k is an index corresponding to a gap between a particular pair of Q portions.

10. An apparatus comprising:
a receiver configured to receive a signal, the received signal including a frame, the frame including a preamble symbol, the preamble symbol having a start time and including Q portions, each of the Q portions having the same pattern, wherein Q is greater or equal to 3, and wherein each of the Q portions has a period of L; and
wherein the receiver includes a synchronizer configured to:
determine a plurality of possible values of a frame timing (FT) corresponding to the start time of the preamble symbol;
determine a plurality of correlation functions including at least one correlation function corresponding to each of the plurality of possible values of the FT, wherein a given correlation function corresponding to a given possible value of the FT represents a correlation between data in two of the Q portions associated with the given FT, and wherein the two of the Q portions are not adjacent in time; and
select one of the plurality of possible values of the FT based at least in part on the determined plurality of correlation functions.

11. The method of claim 10, wherein the determined plurality of correlation functions includes a set of multiple correlation functions, the set of multiple corresponding to each of the plurality of possible values of the FT, wherein a given set of multiple correlation functions corresponding to a given possible value of the FT represents correlations between data in all possible combinations of two portions selected from the Q portions.

12. The apparatus of claim 10, wherein the synchronizer is further configured to determine a plurality of possible values of a carrier frequency offset (CFO) and to jointly select one of the plurality of possible values of the FT and one of the plurality of possible values of the CFO.

13. The apparatus of claim 12, wherein the synchronizer is configured to determine the plurality of possible values of the CFO by determining a plurality of possible values of the CFO for each of the plurality of possible values of the FT.

14. The apparatus of claim 12, wherein the synchronizer is configured to determine the plurality of possible values of the CFO by calculating a single value of the CFO for each of the plurality of possible values of the FT.

\* \* \* \* \*